United States Patent
Duncan

[15] 3,700,941
[45] Oct. 24, 1972

[54] ADJUSTABLE HYSTERESIS CLUTCH AND BRAKE

[72] Inventor: John E. Duncan, 70 Gardenville Parkway West, Buffalo, N.Y. 14224

[22] Filed: Feb. 3, 1971

[21] Appl. No.: 112,243

[52] U.S. Cl................................................310/105
[51] Int. Cl.............................................H02k 49/02
[58] Field of Search............310/92, 93, 96, 99, 166, 103–106, 310/211, 67, 156, 266

[56] References Cited

UNITED STATES PATENTS

| | | | |
|---|---|---|---|
| 2,912,607 | 11/1959 | Duncan | 310/103 |
| 3,027,472 | 3/1962 | Galtz | 310/105 |
| 3,488,536 | 1/1970 | Baermann | 310/105 |
| 3,209,184 | 9/1965 | Woodward | 310/103 |
| 3,365,598 | 1/1968 | Jaeschke | 310/105 |
| 3,303,368 | 2/1967 | Cohen | 310/105 |
| 3,366,810 | 1/1968 | Cohen | 310/96 |

Primary Examiner—R. Skudy
Attorney—Shlesinger, Fitzsimmons & Shlesinger

[57] ABSTRACT

This hysteresis type magnetic device has a permanent magnet secured between two magnetizable pole members on a sleeve which is rotatably mounted on the output shaft coaxially thereof. One pole member is disposed within the other and has a plurality of axially extending external teeth or poles which confront but are radially spaced from a like plurality of internal teeth or poles on the outer pole member. A magnetizable, cup-shaped rotor is secured to the output shaft and has its annular wall projecting into the radial space between the inner and outer poles. The outer pole member is angularly adjustable relative to the inner to vary the angular separation between inner and outer poles, respectively, and hence to vary the transmittable torque in continuous slip braking and continuous or zero slip clutching connections.

8 Claims, 7 Drawing Figures

INVENTOR.
JOHN E. DUNCAN

INVENTOR.
JOHN E. DUNCAN

ATTORNEYS

ADJUSTABLE HYSTERESIS CLUTCH AND BRAKE

This invention relates to torque limiting devices, such as brakes and clutches, and more particularly to permanently magnetized hysteresis means for continuous slip brake and continuous or zero slip clutch applications requiring limitable torque.

It is well known that brakes and clutches may be of the permanent magnet variety, the electromagnetic variety, or combinations thereof, that is, brakes and clutches intended for wholly magnetic slip use may be of the permanent magnetized, magnetized eddy current and hysteresis variety, of combinations of both. Electromagnetic torque limiting clutches and brakes have found much favor because they can be adjusted readily and precisely merely by controlling the power supply to the electrical coil, or coils, that develop the magnetic fields in these devices. Moreover, they can be made to handle extremely high torque loads.

However, electromagnetic clutches have the disadvantage that they must be connected to electrical power supplies in order to operate. Moreover, the overall cost of these devices is increased by the need for the wire coils, which develop the magnetic field, special mounts and housings for these coils, and slip rings, or the like, for connecting the coils to a power supply.

Furthermore, eddy current means are incapable of zero slip operation because slippage is essential to torque procurement. The eddy current torque derives wholly from current shunting that electrically heats the rotor means and as a result decreases eddy current flow and slippage torque as the heating of the rotor increases electrical (flow) resistance.

It is an object of this invention to provide a substantially wear free, continuous slip torque limiting device for transmitting torque by means of a non-wearing magnetic coupling variable over a broad range of torque.

More specifically, it is an object of this invention to provide improved magnetic brakes and clutches of the permanently magnetized variety, which requires no outside power source for its operation, is substantially temperature insensitive, and is extremely reliable in both high and low torque applications.

A further object of this invention is to provide magnetic brakes and clutches of the type described, which can readily and accurately be adjusted to vary the torque transmittable by the clutch from a driving to a driven member.

A more specific object of this invention is to provide an improved permanent magnetic clutch having confronting, circumferential poles which are angularly adjustable relative to one another to vary the hysteresis of the clutch, hence the torque transmittable thereby.

Another object of the invention is to provide a brake or clutch employing optimum high resistance rotors inhibiting eddy current flow and procuring hysteresis torque via torque displaced magnetic linkages.

Another object of this invention is to provide preinstallation and post installation adjustable permanently magnetized brakes and clutches.

Another object of the invention is to provide hysteresis brake and clutch apparatus employing minimal inertia brake input and clutch output coupling or mounting means.

Still another object of this invention is to provide magnetic clutch and brake apparatus that achieves hysteresis torque via torque displaced or torque distorted magnetic linkages which link through rotor means.

Other objects of the invention will be apparent hereinafter from the specification and from the recital of the appended claims, particularly when read in conjunction with the accompanying drawings.

Figure 1:
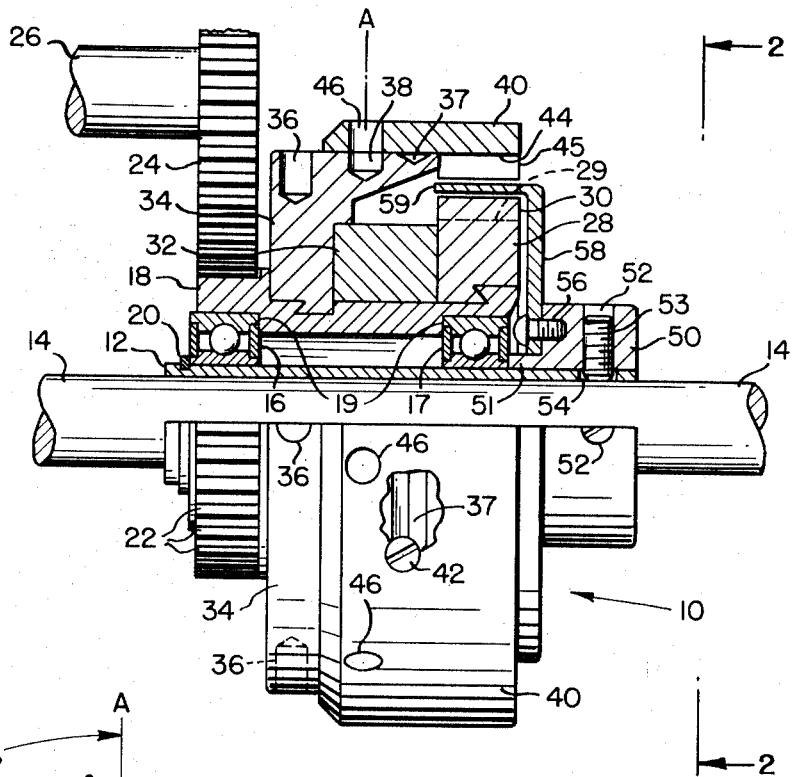
FIG. 1 is a fragmentary part side elevational, part axial sectional view of a magnetic hysteresis clutch made in accordance with one embodiment of this invention.

Referring now to the drawings by numerals of reference, 10 denotes generally a continuous — and zero — slip clutch mounted on an inner sleeve 12, which is fastened to an output shaft 14 and which preferably is made of a non-magnetic material. Mounted to rotate coaxially about sleeve 12 on conventional, axially spaced, anti-friction bearings 16 and 17, is a non-magnetic sleeve 18. Bearings 16 and 17 seat in counterbores 19 formed in opposite ends of this sleeve. A conventional snap ring 20 retains bearing 16 against movement in one direction on sleeve 12.

At its left end (FIG. 1) sleeve 18 is integral with a gear 22, which is driven by a gear 24, that is fastened to drive shaft 26.

Fastened to the opposite end of the sleeve 18 for rotation therewith is a magnetizable inner pole member 28. On its outer periphery member 28 has a plurality of axially extending grooves 29, which are equiangularly spaced from one another, and which define a plurality of equiangularly spaced externally projecting salient poles 30.

Secured to and surround the sleeve 18 intermediate its ends, and abutting the inner or left-hand face (FIG. 1) of the member 28, is an annular permanent magnet 32. The outer diameter of magnet 32 is less than that of the member 28, so that the teeth 30 on member 28 project radially beyond the outer periphery of the magnet.

Secured to and surrounding the sleeve 18 between magnet 32 and gear 22, with its open end surrounding magnet 32, is a magnetizable member 34. Adjacent its closed or left end in FIG. 1, member has in its outer peripheral surface one or more radial holes 36, which are the external reference for one or more reference holes 38 formed in member 34 adjacent holes 36. Holes 38 are equal in number to, and axially aligned with, holes 36. Adjacent its opposite or open end (the right end in FIG. 1) member 34 is formed with a circumferential groove 37 which is V-shaped in cross section.

Mounted for rotational angular adjustment around the open end of member 34 is an adjustable collar or outer pole member 40. A setscrew 42 (FIG. 1), which threads into a radial hole in pole member 40, projects at its inner end into groove 37 in member 34 to secure collar 40 against axial and radial movement on member 34, while permitting the collar to be rotated relative to member 34, when screw 42 is loosened. Collar 40 extends axially beyond the open end of member 34; and this extending portion of the collar is provided with a plurality of axially extending, equiangularly spaced grooves 44, which define angularly-spaced internal salient poles 45. These salient poles are radially spaced outwardly from the salient poles 30 on inner pole member or ring 28.

Adjacent its left end, collar 40 has therethrough a plurality of angularly spaced radial holes 46, each of which is capable of registering radially with the reference hole 38 in member 34 upon proper angular adjustment of collar 40. The holes 46 are used to adjust the angular relationship between the salient poles 30 and 45 on the inner and outer pole members, respectively.

Press fit on the right end (FIG. 1) of sleeve 12 is a hub 50. At its inner end hub 50 has a reduced-diameter portion 51, which seats against the ball bearing 17 to secure the latter on sleeve 12. Hub 50, and the sleeve 12, are fastened to the shaft 14 by setscrews 52, which thread through registering apertures 53 and 54 in bushing 50 and sleeve 12, respectively, into contact with output shaft 14. The set-screw cooperates with snapping 20, 50, bearings 16 and 17, and the non-magnetic field member 18 to retain sleeve 12 and thus the whole assembly on shaft 14.

Mounted on hub 50, and fastened thereto by screws 56 is a generally cup-shaped rotor 58, which is made from a magnetizable material having high hysteresis characteristics. The open end of rotor 58 surrounds the salient poles of member 28, and the annular wall portion 59 of this rotor rotates in the space between the confronting poles 30 and 45, respectively, of the two pole members.

As previously noted, the inner pole member 28, and the supporting field member 34 for the outer pole member 40, are both fixed on sleeve 18. This maintains the reference hole 38 in angular registry with the midpoint of one of the inner poles 30 (the uppermost in FIG. 2) on member 28. The angular position of poles 45 on the outer pole member 40 can be adjusted relative to hole 38 by rotating collar 40 relative to member 34 until a preselected one of the openings 46 in collar 40 is brought into registry with bore 38.

Figure 2:
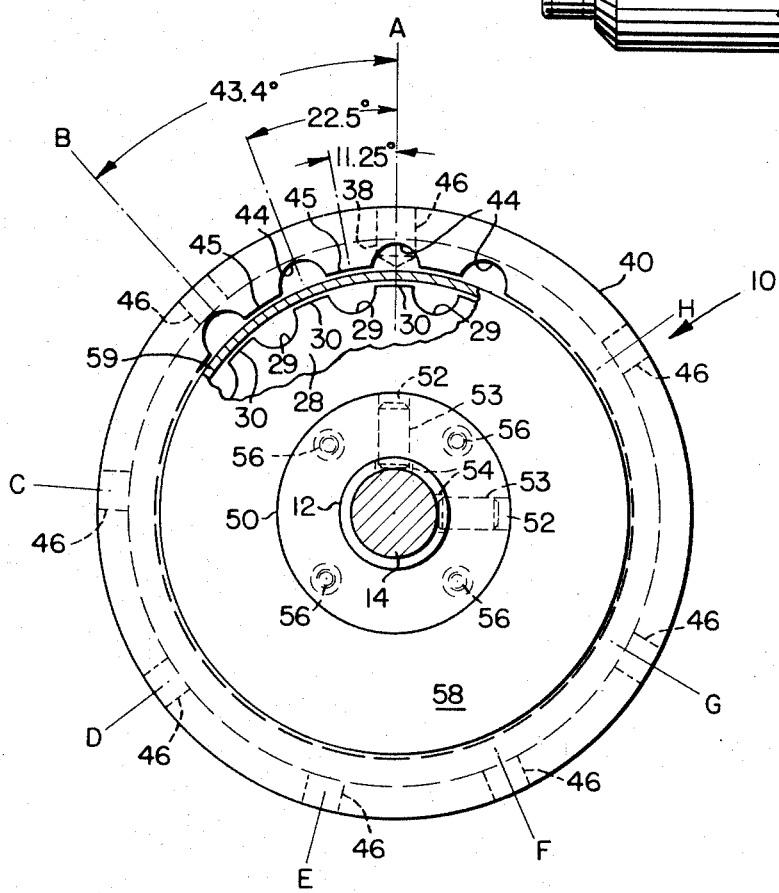
FIG. 2 is a sectional view taken along the line 2—2 in FIG. 1 looking in the direction of the arrows, with a portion of the clutch rotor being broken away for purposes of illustration.

In FIG. 2 the openings 46 in the collar 40, here shown as eight, are designated A, B, C, D, E, F, G and H. On each of the inner and outer pole members 28 and 40, respectively, the associated poles 30 and 45, respectively, are equiangularly spaced from one another about the axis of sleeve 12, as are the associated grooves 29 and 44, respectively. If as shown in FIG. 2 the collar 40 is adjusted so that the first of its index apertures 46 (opening A) is disposed in registry with the reference hole 38, the inner poles 30 will register, approximately, with the grooves 44 on the outer pole member 40. This corresponds to the maximum angular separation of inner poles 30 relative to outer poles 45, so that the magnetic lines of flux developed by the permanent magnet 32 between the inner and outer poles 30 and 45 are concentrated at and between the confronting faces of these poles. In this position of collar 40 the magnetic flux lines extending between the inner and outer poles have, therefore, their greatest effect on the intervening wall 59 of rotor 58, so that when the drive shaft 26 causes the inner and outer pole members 28 and 40 to be rotated in either direction, the magnetic flux lines extending between the poles of these members transmit maximum possible torque to rotor 58, and therefore to output shaft 14.

To reduce the torque transmittable by the clutch, the outer pole member or collar 40 is rotated on member 34 to reduce the angular distance separating the inner and outer poles 30 and 45, or in other words, to place the faces of these poles more nearly in registry with one another. As the faces of poles 30 and 45 approach angular registry, the flux lines connecting the pole faces tend more and more to become concentrated between the partly confronting faces of the poles until finally, when the faces of the inner poles 30 are in substantial angular registry with the faces of poles 45, the hysteresis effect of the flux lines through the rotor 58 is reduced to a minimum, to reduce accordingly the transmittable torque to a minimum.

Figure 3:
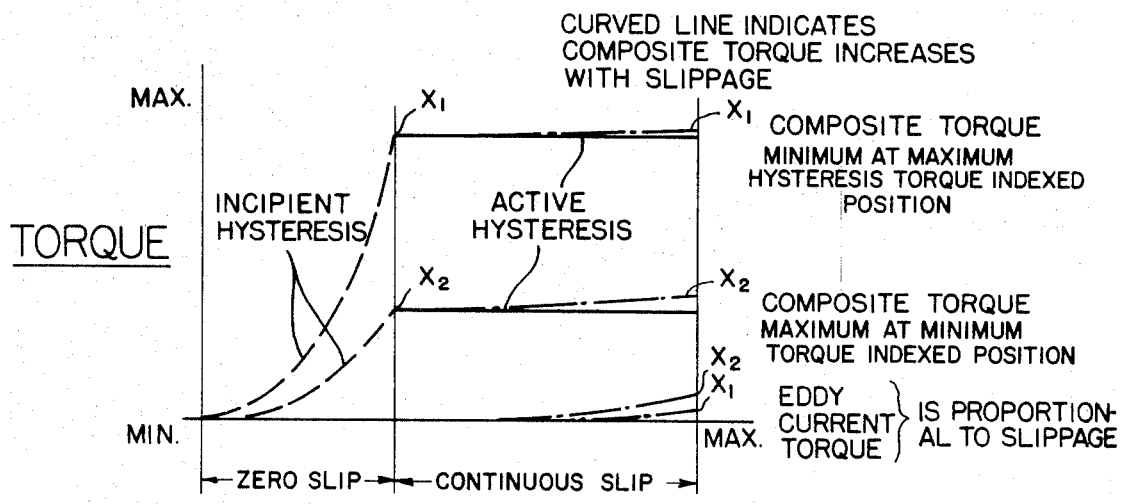
FIG. 3 is a diagram illustrating the sequence of incipient torques, active hysteresis torques, and composite torques obtained with a brake or clutch built according to this invention, and illustrates that the eddy-current torque portion of a composite torque decreases as the hysteresis torque is increased.

In the embodiment of the invention shown in FIG. 2, the index openings 46 (A through H) are angularly separated 43.4° from one another about the axis of sleeve 12. This angular separation is 1.6° less than twice the angular distance (22.5°) separating successive recesses 44 in outer pole member 40. Consequently, when the collar 40 is rotated clockwise from its position illustrated in FIG. 2, so as to place index opening B instead of aperture A, in registry with the reference hole 38, the faces of the inner and outer poles 30 and 45 will be 1.6° closer to registry with one another. As each successive opening 46 (C through H) is rotated into registry with the reference hole 38, the outer poles 45 are shifted 1.6° closer to full registry with the inner poles 30, until, when the index opening H is positioned above and in registry with the reference bore 38, the inner and outer poles 30 and 45 are approximately in full registry with one another, so that minimum torque is transmitted to the rotor 58. In FIG. 3, $x_1$ denotes the minimum preset torque adjustment, and $x_2$ designates the maximum preset torque adjustment. As indicated on the diagram the eddy current torque is proportional to the indexed position of part 40 and to slippage.

Figure 6:
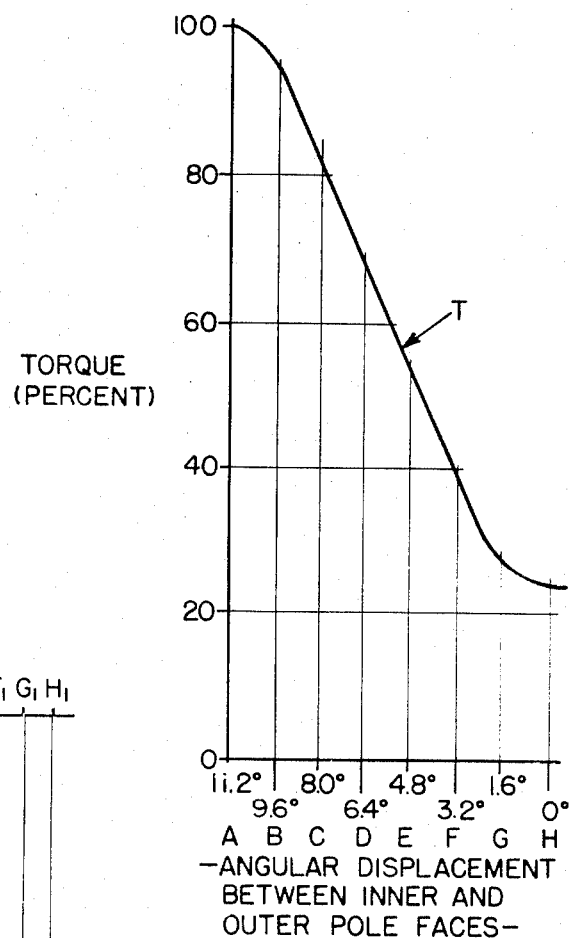
FIG. 6 is a diagram applying to FIG. 1 and illustrating the percent of change in transmittable torque which is effected by incremental adjustment of the clutch.

This replacement between the transmitted torque and the angular displacement between the inner and outer poles 30 and 45 is illustrated graphically in FIGS. 3 and 6. These diagrams show the incremental torques obtained and that composite (eddy-current and hysteresis) torques have the highest percentages of eddy currents when the magnetic poles are aligned face to face, and minimal percentages when obtusely aligned. Moreover, the diagram of FIG. 3 shows the order of torque procurement. An incipient hysteresis torque is first used, followed by an active hysteresis torque, and then by a composite torque. This diagram also shows that an active hysteresis torque is equal to a peak incipient hysteresis torque, that an active hysteresis torque is unaffected by change in slippage velocity, and that an eddy current torque (or composite torque) is affected by a change in slip velocity.

In use, the collar 40 is first adjusted to set the clutch 10 for the desired torque that is to be transmitted from output shaft 14. This is done by loosening the screw 42, and rotating collar 40 until the desired index opening 46 is in registry with the reference hole 38, after which screw 42 is tightened again to hold collar 40 against rotation on member 34. When torque is then applied to the input shaft 26, it is transmitted through pinion 24 and gear 22 to sleeve 18, and consequently to the inner and outer pole members 28 and 40. The magnetic field developed by magnet 32 between the adjustable poles 30 and 45 magnetically grips the annular wall portion 59 of the rotor 58. The output shaft 14 is thus rotated with zero slippage or continuous slippage at the torques the clutch 10 is capable of transmitting until the load thereon exceeds the clutch torque transmission, at which time the magnetic coupling between poles 30, 45 and the rotor 58 is overcome, and shaft 14 stops, while the pole members 28 and 40 continue to be rotated by input shaft 26.

To adjust the collar 40 on the member 34 two cylindrical pins (not illustrated) may be employed. One of the pins is inserted into one of the holes 36, and the other into that hole 46 which is to be moved into registry with the reference hole 38. The pin in hole 36 is used to hold the member 34 against angular rotation while the other pin is being used to rotate collar 40.

Figure 4:
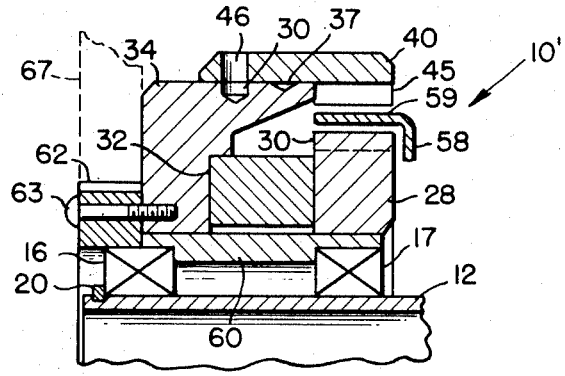
FIG. 4 is a fragmentary axial sectional view of a modified form of clutch adaptable to brake applications.

Referring now to FIG. 4, wherein like numerals are employed to designate elements similar to those employed in the first embodiment, 10' designates a modified magnetic clutch that is adaptable in brake applications and in which a sleeve 60 is mounted on antifriction bearings 16 and 17 to rotate coaxially about the sleeve 12. As in the case of the first embodiment, ring 60 is press fit, or otherwise secured, in the bores of the surrounding members 28, 32 and 34, so that the latter rotate with the ring 60.

Unlike sleeve 18 in the first embodiment, however, wherein gear 22 is integral with the sleeve, the sleeve 60 is pressed into members 28 and 34. 62 denotes a detachable, non-magnetic gear, which is piloted by the bearing 16 that is retained by snap-ring 20, sleeve 12, and sleeve 60. As shown, the gear 62 is secured to the outer face of member 34 be screws 63, only one of which is illustrated in FIG. 4. In a clutch application, the input torque is transmitted by the gear 62 and screws 63 to member 34. Clutch 10' is otherwise identical in construction and operation with clutch 10. In a brake adaption, the gear 62 is omitted and the member 34 is secured to a fixed support, such as a bulkhead 67, by screws 63.

Figure 5:
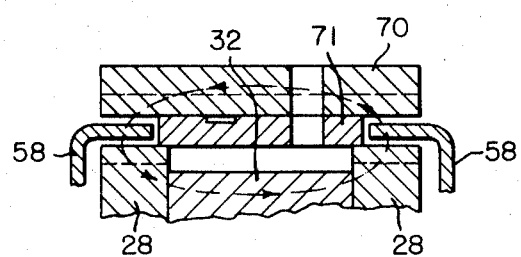
FIG. 5 illustrates fragmentarily and schematically a way in which a brake or clutch can be modified to employ dual rotors rather than a single rotor.

FIG. 5 illustrates schematically a further modification of the magnetic device shown in FIGS. 1 and 2. Here, a pair of axially spaced, cup-shaped rotor members 58 are secured to what in a clutch is the output shaft and in a brake is the input shaft. The magnetizable member 70 forms an outer pole means and serves as a clutch input or a brake mounting member. The inner pole members and the magnet are retained in an assembly, in the manner of FIG. 4, by a press-fit sleeve. The poles 28 retain the non-magnetic sleeve 71 that is provided with holes for the indexing adjustment. One index hole is provided in member 70. The flux of magnet 32 links through the members 28, 58 and 70 to develop a series-type magnetic field as shown by the broken lines and arrows. In this embodiment it will be noted that the polarity of the inner and outer poles differs for each of the rotors 58.

From the foregoing it will be apparent that applicant has developed an extremely compact, reliable and substantially maintenance-free magnetic clutch, which needs no outside electrical power source in order to operate it, and which will not therefore be subject to heating up during use due to electric power. Moreover, the torque that is transmittable by the clutch is readily adjustable in fine increments, merely by making slight angular adjustments between the positions of the inner and outer pole teeth. Moreover, the magnetism developed in the driven rotor 58 actually oscillates during rotation of the rotor so that, in effect, no salient poles are developed in the rotor, and consequently undesirable cogging is eliminated. Furthermore, it has been found that by adjusting the inner and outer poles angularly relative to one another about the common axis of the clutch, it is possible more accurately to control incremental adjustments in the value of the transmittable torque.

Figure 7:
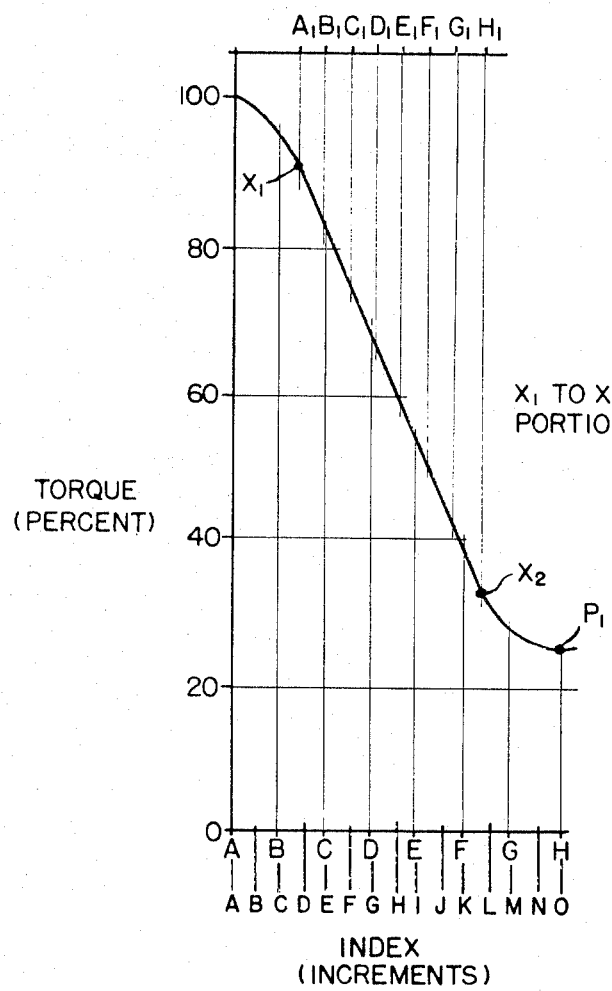
FIG. 7 is a torque percentage diagram illustrating optional (linear torque and maximal incremental torque) indexing.

FIG. 7 shows how by adjusting the collar 40, to shift the positions of poles 45 relative to poles 30, the percent of transmittable torque may be changed. In this FIG. the adjustment is such that the torque transmitted is linear as indicated by the positions of the points $X_1$ and $X_2$ on the curve. FIG. 7 shows also that the number of holes (A to O) in collar 40 may be different than the number (A to H) illustrated in FIGS. 2 and 6 for smaller or larger adjustment increments.

While in the embodiment illustrated in FIGS. 1 and 2 sixteen angularly spaced teeth have been employed in both the inner and outer pole members, it will be understood that the exact number of teeth in each member can be varied without departing from this invention. It has been found that the clutch or brake operates best when equally spaced poles of equal width are employed. The dimensions of the air gaps between the inner and outer poles, and the annular portion 59 of the rotor 58, may vary depending upon the application for which the clutch is designed.

Furthermore, while the invention has been described specifically in connection with a clutch, it is to be understood, as stated, that it is equally applicable to brakes. Thus, in FIG. 1 if the shaft 26 is considered as, and is, stationary, the device will function as a brake operating on shaft 14.

Having thus described my invention, what I claim is:
1. A magnetic slip torque device, comprising
   a rotatable output shaft,
   a first magnetizable member rotatably mounted on said output shaft,
   an outer pole member mounted on said first member for rotatable adjustment thereon about the axis of said output shaft, said outer pole member having a plurality of internally projecting angularly spaced poles, a rotatable, magnetizable inner pole member axially aligned with said outer pole member and rotatably mounted on said output shaft, and having a plurality of externally projecting angularly spaced poles, equal in number to the number of poles on said outer pole member, said outer poles surrounding said inner poles in radially spaced confronting relation thereto, sand having a polarity different from said inner poles so that magnetic flux lines extend between said inner and outer poles, an annular permanent magnet rotatably mounted on said output shaft between said pole members in axial alignment therewith to rotate with said pole members and operative to develop a magnetic field between said inner and outer poles, a driven member secured to said output shaft and having an annular magnetizable portion projecting into the radial space between said inner and outer poles and magnetically coupled to said poles, and means for driving said first member, said pole members being angularly adjustable relative to one another about the axis of said output shaft to adjust the torque transmittable to said output shaft.

2. A magnetic slip torque device as claimed in claim 1, wherein said first member, said permanent magnet, and said inner pole member are rotatably mounted on a sleeve which is fixed to said output shaft, and said driven member is also fixed to said output shaft.

3. A magnetic slip torque device as defined in claim 1, including a second plurality of inner, angularly spaced magnetic poles axially spaced from the first-named inner poles, and mounted to rotate with said first-named inner poles coaxially of said common axis, a second plurality of outer, angularly spaced magnetic poles surrounding said second plurality of inner poles in radially spaced confronting relation thereto, and mounted to rotate with said second plurality of inner poles, and a second driven member having a magnetizable annular portion projecting into the radial space between said second pluralities of inner and outer poles, respectively, thereby magnetically to be coupled to said second pluralities of poles for rotation therewith about said common axis.

4. A magnetic slip torque device, comprising a drive member, a driven member, and means mounting said members for rotation relative to one another about a common axis, said drive member comprising a first plurality of poles angularly spaced about said axis, and rotatable with said drive member, a second plurality of angularly spaced poles surrounding said first plurality in radially spaced confronting relation thereto, and rotatable therewith, and a permanent magnet secured to said drive member adjacent said first plurality of poles and operative to develop a magnetic field between said first and second pluralities of poles, respectively, and said driven member having an annular, magnetizable portion projecting into the radial space between said first and second pluralities of poles magnetically to be coupled to said drive member, and means for angularly adjusting one of said first and second pluralities of poles relative to the other about said axis thereby to adjust the torque transmittable by said magnetic field from said drive to said driven member.

5. A magnetic slip torque device as defined in claim 4, wherein said first plurality of poles are fixed to said drive member, said second plurality of poles are carried by a ring, which surrounds said drive member and is angularly adjustable thereon, said drive member has in its outer surface a reference hole, and said ring has therethrough a plurality of angularly spaced radial openings registrable selectively with said reference hole, upon angular adjustment of said ring on said drive member, said drive member being operative to transmit a different maximum torque to said driven member when different openings in said ring are in registry with said reference hole.

6. A magnetic slip torque device as defined in claim 5, wherein said drive member has a circumferential groove in its outer surface beneath said ring, and a setscrew is threaded through a radial opening in said ring and engaged at its inner end in said groove releasably to secure said ring against rotation on said drive member.

7. A magnetic hysteresis type torque device, comprising a rotatable drive member and a rotatable driven member, one of said members having a first set of magnetizable poles angularly spaced about its axis, and having a second set of magnetizable poles disposed in operative relation to said first set of poles but spaced therefrom, the other of said members having a magnetizable part projecting into the space between said first and second sets of poles, a permanent magnet secured to one of said members to rotate therewith, and operative magnetically to couple said members, and means for adjusting one of said sets of poles relative to the other set of poles about the axis of the member having the two sets of poles.

8. A magnetic hysteresis type torque device comprising a first rotatable member having a plurality of angularly spaced magnetic poles, a second member having a plurality of angularly spaced magnetic poles disposed in confronting relation to the poles of said first member, the poles of the two members having different polarity so that magnetic flux lines extend between said members, and means for angularly adjusting one of said members angularly relative to the other about the axis of rotation of said first member, thereby to vary the hysteresis of the device, to adjust the torque transmitted between said members, said device operating with incipient hysteresis torque and zero slip when the load thereon does not exceed the torque which said members are adjusted to transmit, and operating at continuous slip torque when the load on said device is equal to the torque which said members are adjusted to transmit, and said device operating with composite eddy current and hysteresis torque in proportion to the slippage between said members, the composite torque having the highest percentage of eddy currents when the poles are aligned face to face.

* * * * *